(12) United States Patent
Christensen et al.

(10) Patent No.: US 9,012,001 B2
(45) Date of Patent: Apr. 21, 2015

(54) UNBONDED, FLEXIBLE PIPE

(75) Inventors: Claus Dencker Christensen, Albertslund (DK); Inger-Margrete Procida, Hellerup (DK); Martin Damgaard Christensen, Herlev (DK)

(73) Assignee: National Oilwell Varco Denmark I/S, Brondby (DK)

(*) Notice: Subject to any disclaimer, the term of this patent is extended or adjusted under 35 U.S.C. 154(b) by 119 days.

(21) Appl. No.: 13/515,337

(22) PCT Filed: Dec. 13, 2010

(86) PCT No.: PCT/DK2010/050336
§ 371 (c)(1),
(2), (4) Date: Jul. 3, 2012

(87) PCT Pub. No.: WO2011/072690
PCT Pub. Date: Jun. 23, 2011

(65) Prior Publication Data
US 2012/0261017 A1    Oct. 18, 2012

(30) Foreign Application Priority Data

Dec. 15, 2009  (DK) ................................ 2009 01328
Nov. 20, 2010  (DK) ................................ 2010 01020

(51) Int. Cl.
*B32B 1/08* (2006.01)
*F16L 11/10* (2006.01)
*B32B 23/00* (2006.01)

(52) U.S. Cl.
CPC ...................................... *F16L 11/10* (2013.01)

(58) Field of Classification Search
CPC ................................ B23B 1/08; F16L 2011/04
USPC .................... 428/34.1, 34.2, 35.7, 35.9, 36.9; 138/125, 137, 140
See application file for complete search history.

(56) References Cited

U.S. PATENT DOCUMENTS

| | | | |
|---|---|---|---|
| 3,212,528 A | 10/1965 | Haas | |
| 3,311,133 A | 3/1967 | Kinander | |
| 3,687,169 A | 8/1972 | Reynard | |
| 3,858,616 A | 1/1975 | Thiery et al. | |
| 4,007,070 A | 2/1977 | Busdiecker | |
| 4,549,581 A | 10/1985 | Unno et al. | |
| 4,706,713 A | 11/1987 | Sadamitsu et al. | |
| 4,850,395 A | 7/1989 | Briggs | |
| 5,176,179 A | 1/1993 | Bournazel et al. | |
| 5,213,637 A | 5/1993 | Mallen Herrero et al. | |
| 5,407,744 A | 4/1995 | Mallen Herrero et al. | |
| 5,601,893 A | 2/1997 | Strassel et al. | |
| 5,645,109 A | 7/1997 | Herrero et al. | |
| 5,669,420 A | 9/1997 | Herrero et al. | |
| 5,730,188 A | 3/1998 | Kalman et al. | |
| 5,813,439 A | 9/1998 | Herrero et al. | |
| 5,837,083 A | 11/1998 | Booth | |
| 5,922,149 A | 7/1999 | Mallen Herrero et al. | |
| 6,016,847 A | 1/2000 | Jung et al. | |
| 6,065,501 A | 5/2000 | Feret et al. | |
| 6,085,799 A | 7/2000 | Kodaissi et al. | |
| 6,123,114 A | 9/2000 | Seguin et al. | |
| 6,145,546 A | 11/2000 | Hardy et al. | |
| 6,192,941 B1 | 2/2001 | Mallen-Herrero et al. | |
| 6,253,793 B1 | 7/2001 | Dupoiron et al. | |
| 6,283,161 B1 | 9/2001 | Feret et al. | |
| 6,291,079 B1 | 9/2001 | Mallen Herrero et al. | |
| 6,354,333 B1 | 3/2002 | Dupoiron et al. | |
| 6,382,681 B1 | 5/2002 | Berton et al. | |
| 6,390,141 B1 | 5/2002 | Fisher et al. | |
| 6,408,891 B1 | 6/2002 | Jung et al. | |
| 6,415,825 B1 | 7/2002 | Dupoiron et al. | |
| 6,454,897 B1 | 9/2002 | Morand | |
| 6,516,833 B1 | 2/2003 | Witz et al. | |
| 6,668,867 B2 | 12/2003 | Espinasse et al. | |
| 6,691,743 B2 | 2/2004 | Espinasse | |
| 6,739,355 B2 | 5/2004 | Glejbol et al. | |
| 6,807,988 B2 * | 10/2004 | Powell et al. | 138/125 |
| 6,840,286 B2 | 1/2005 | Espinasse et al. | |
| 6,889,717 B2 | 5/2005 | Coutarel et al. | |
| 6,889,718 B2 | 5/2005 | Glejbol et al. | |
| 6,904,939 B2 | 6/2005 | Jung et al. | |
| 6,978,806 B2 | 12/2005 | Glejbol et al. | |
| 6,981,526 B2 | 1/2006 | Glejbol et al. | |
| 7,032,623 B2 | 4/2006 | Averbuch et al. | |
| 7,311,123 B2 | 12/2007 | Espinasse et al. | |
| 7,487,803 B2 | 2/2009 | Lokere et al. | |
| 7,976,920 B2 | 7/2011 | Braad et al. | |
| 8,163,364 B2 | 4/2012 | Braad et al. | |
| 2001/0003992 A1 | 6/2001 | Espinasse | |
| 2003/0102044 A1 | 6/2003 | Coutarel et al. | |

FOREIGN PATENT DOCUMENTS

| | | |
|---|---|---|
| WO | 01/61232 A1 | 8/2001 |
| WO | 02/061317 A2 | 8/2002 |
| WO | 2005/028198 A1 | 3/2005 |
| WO | 2008/025893 A1 | 3/2008 |
| WO | 2008/077409 A1 | 7/2008 |
| WO | 2008/077410 A1 | 7/2008 |
| WO | 2009/024156 A2 | 2/2009 |

OTHER PUBLICATIONS

Recommended Practice for Flexible Pipe, API recommended practice 17B, Third Edition, Mar. 2002.

* cited by examiner

*Primary Examiner* — Marc Patterson
(74) *Attorney, Agent, or Firm* — Pearne & Gordon LLP

(57) ABSTRACT

The invention relates to an unbonded, flexible pipe having a length and comprising from inside out, a tubular inner sealing sheath, at least one metal armor layer and an outer sealing sheath of a sealing material. The unbonded, flexible pipe comprises at least one stiffened length section comprising a stiffening cover partially or totally surrounding the outer sealing sheath in the stiffened length section. The stiffening cover comprises a layer of a stiffening material having a flexural modulus which is higher than the flexural modulus of the sealing material, wherein the flexural modulus is determined according to ISO 178.

20 Claims, No Drawings

UNBONDED, FLEXIBLE PIPE

TECHNICAL FIELD

The invention relates to an unbonded, flexible pipe in particular for transportation of hydrocarbons and/or for an umbilical as well as a method for increasing the stiffness of a flexible pipe.

BACKGROUND ART

Within the art of flexible pipe there are two main groups, bonded pipes and unbonded pipes. An example of a bonded pipe is disclosed in WO 02/061317. Bonded pipes usually consist of a number of reinforcement layers bonded together with bonding agents to affect a strong bond therebetween.

Flexible pipes of the present type are of the unbonded type, which differs substantially from the bonded type. Flexible unbonded pipes are well known in the art in particular for offshore transportation of fluids and are for example described in API (American Petroleum Institute) 17B. "Recommended Practice for Flexible Pipe", which is used as a standard within the field. Flexible unbonded pipes usually comprise an inner liner also often called an inner sealing sheath or an inner sheath, which forms a barrier against the outflow of the fluid which is conveyed through the pipe, and one or more armoring layers of metal, such as steel on the outer side of the inner liner (outer armoring layer(s)). The flexible pipe usually comprises an outer sheath, provided with the object of forming a barrier against the ingress of fluids from the pipe surroundings to the armor layers.

Typical unbonded flexible pipes are e.g. disclosed in WO0161232A1, U.S. Pat. No. 6,123,114 and U.S. Pat. No. 6,085,799.

In order to have sufficient strength, in particular to prevent the collapse of the inner sealing sheath, the flexible pipe may for certain applications comprise an armor layer located inside the space defined by the inner sealing sheath. Such inner armoring layer or layers are normally referred to as a carcass.

In this text the term "unbonded" means that at least two of the layers including the armoring layers and polymer layers are not bonded to each other. In practice the known unbonded, flexible pipe normally comprises at least two armoring layers located outside the inner sealing sheath, which armoring layers are not bonded to each other neither directly nor indirectly via other layers along the pipe. The pipe layers can therefore move with respect to each other, and thereby the pipe becomes bendable not merely for rolling up for transportation but also sufficiently flexible for being applied in a dynamic application where a high flexibility is often important for being able to withstand the high impacts high mechanical and turbulent forces it may be subjected to in use. If the flexible pipe does not have the required flexibility it may often be damaged e.g. by being subjected to undesired deformations and/or breaking of reinforcement wires.

The above-mentioned type of unbonded, flexible pipes is in particular useful for dynamic offshore applications for the transport of fluids including liquids and/or gasses, in particular petrochemical products. In particular such unbonded, flexible pipes may be used for risers, but they may also with advantage be used in other applications e.g. for flow lines. A riser is a pipe which at least in a length section is used for transporting a fluid vertically i.e. closer to or away from the seabed. Unbonded, flexible pipes in the form of risers may extend partly or totally from one sea surface installation (an installation on or near the surface of the sea) to another, from one sea surface installation to a sub sea installation or from the seabed up to a sea surface installation.

Risers need to be able to move dynamically and to withstand the forces and dynamic motions they will subjected to such as high or varying water pressures along the longitudinal axis of the pipe and dynamic motions due to turbulence, wind, high and varying waves, water current and other weather conditions which set the sea in motion.

The unbonded, flexible pipe should have a high flexibility to follow the motions it will be subjected to during use. If the armoring layers—which are usually of wires e.g. helically wound wires—are too stiff, the wires may be deformed or even break and the whole pipe will be damaged. On the other hand the motion of the pipe and/or the sea surface installation may result in an overbending of the pipe, which is equally damaging.

The object of the invention is to provide an unbonded, flexible pipe which has a high flexibility and simultaneously a low risk of overbending even when subjected to dynamic applications.

DISCLOSURE OF INVENTION

The flexible pipe of the invention is as defined in the claims. Additional beneficial solutions which may have additional advantages are defined in the sub claims and are described in the following.

According to the invention a new type of flexible pipes has been provided. The flexible pipe of the invention comprises an axis and a tubular inner sealing sheath surrounding the axis, the inner sealing sheath is surrounded by at least one outer armoring layer. The inner sealing sheath has an inner side which is the side of the inner sealing sheath facing the axis. In other words, all that is surrounded by the inner sealing sheath is on the inner side of the inner sealing sheath.

In the following the term "length of the pipe" is used to mean the length along the axis of the pipe. The space inside the inner sealing sheath is also referred to as the bore of the pipe.

The terms "axial direction" or "axially" are used to mean the direction along the length of an axis of the pipe. Generally it is desired that the flexible pipe is substantially circular in cross sectional shape, however, it should be understood that the flexible pipes could have other cross sectional shapes such an oval, elliptical or slightly angular (angular with rounded edges). In such situations the axis of the flexible pipes may be determined as the most central axis in the bore of the flexible pipe. The terms "outside" and "inside" a member and/or a layer are used to mean "outside, respectively inside the member and/or a layer in radial direction from, and perpendicular to the axis of the pipe and radially out an outermost surface of the pipe".

Further scope of applicability of the present invention will become apparent from the description given hereinafter. However, it should be understood that the detailed description and specific examples, while indicating preferred embodiments of the invention, are given by way of illustration only, since various changes and modifications within the spirit and scope of the invention will become apparent to those skilled in the art from the following description.

The unbonded, flexible pipe of the invention has a length and comprises from inside out, a tubular inner sealing sheath, at least one metal armor layer and an outer sealing sheath of a sealing material for protecting the armor of the pipe against ingress of sea water.

The flexible pipe of the invention is an unbonded pipe meaning that at least two layers of the pipe are not bonded to each other but may move with respect to each other. In a preferred embodiment the flexible pipe of the invention comprises at least two metal armoring layers which are not bonded to each other but can move with respect to each other. As it is well known an anti-wear layer may be applied between the metal armoring layers to ensure that they can move with respect to each other. Anti-wear layers, their use and useful materials are e.g. described in Recommended Practice for Flexible Pipe API 17B, March 2002.

The configuration of armoring layers is well known in the art and the flexible pipe of the invention may have any armoring structure, such as the armoring structures known from prior art e.g. comprising a pressure armor of wound wires in a relatively high angle to the pipe axis e.g. about 80 degrees or more and a pair of tensile armor layers e.g. cross wound with angles below 55 degree. Examples or armors and profiles thereof are e.g. the armors described in any one of U.S. Pat. No. 5,176,179, U.S. Pat. No. 5,813,439, U.S. Pat. No. 3,311, 133, U.S. Pat. No. 3,687,169, U.S. Pat. No. 3,858,616, U.S. Pat. No. 4,549,581, U.S. Pat. No. 4,706,713, U.S. Pat. No. 5,213,637, U.S. Pat. No. 5,407,744, U.S. Pat. No. 5,601,893, U.S. Pat. No. 5,645,109, U.S. Pat. No. 5,669,420, U.S. Pat. No. 5,730,188, U.S. Pat. No. 5,730,188, U.S. Pat. No. 5,813, 439, U.S. Pat. No. 5,837,083, U.S. Pat. No. 5,922,149, U.S. Pat. No. 6,016,847, U.S. Pat. No. 6,065,501, U.S. Pat. No. 6,145,546, U.S. Pat. No. 6,192,941, U.S. Pat. No. 6,253,793, U.S. Pat. No. 6,283,161, U.S. Pat. No. 6,291,079, U.S. Pat. No. 6,354,333, U.S. Pat. No. 6,382,681, U.S. Pat. No. 6,390, 141, U.S. Pat. No. 6,408,891, U.S. Pat. No. 6,415,825, U.S. Pat. No. 6,454,897, U.S. Pat. No. 6,516,833, U.S. Pat. No. 6,668,867, U.S. Pat. No. 6,691,743, U.S. Pat. No. 6,739,355 U.S. Pat. No. 6,840,286, U.S. Pat. No. 6,889,717, U.S. Pat. No. 6,889,718, U.S. Pat. No. 6,904,939, U.S. Pat. No. 6,978, 806, U.S. Pat. No. 6,981,526, U.S. Pat. No. 7,032,623, U.S. Pat. No. 7,311,123, U.S. Pat. No. 7,487,803, US 23102044, WO 28025893, WO 2009024156, WO 2008077410 and WO 2008077409.

The unbonded, flexible pipe of the invention comprises at least one stiffened length section comprising a stiffening cover partially or totally surrounding the outer sealing sheath in the stiffened length section, the stiffening cover comprises a layer of a stiffening material with a flexural modulus which is higher than the flexural modulus of the sealing material, wherein the flexural modulus is determined according to ISO 178.

The stiffened length section is stiffer than the unbonded, flexible pipe would have been in the same section if the unbonded, flexible pipe did not have the stiffening cover. However, the stiffening cover has virtually no stiffening effect against bends and flexing, below a certain degree of bending and for most dynamic mechanical influences on the pipe e.g. due to water current and or waves the stiffened length section has shown to act with an almost similar flexible response that it would have done without the stiffening cover.

Therefore, according to the present invention it is now possible to obtain the high and desired dynamic flexibility, while simultaneously reducing the risk of bending the unbonded, flexible pipe to a degree where it is damaged.

For increased safety against damaging of the flexible pipe by bending, the unbonded, flexible pipe may in one embodiment comprise a stiffening cover comprising a layer of a stiffening material with a flexural modulus which is higher than the flexural modulus of the sealing material at a temperature closer to or at the temperature which the stiffening material may have during use. In one embodiment the flexural modulus is therefore determined at a higher temperature such as about 50° C., such as about 75° C. and/or such as about 90° C.

In one embodiment the stiffening material has a flexural modulus which is at least about 10 MPa, such as at least about 25 MPa, such as at least about 50 MPa, such as at least about 100 MPa, such as at least about 125 MPa, such as at least about 150 MPa, such as at least about 200 MPa, such as at least about 250 MPa higher than the flexural modulus of the outer sealing sheath.

The optimal flexural modulus depends largely on the pipe structure and the application of the pipe. The skilled person will be able to determine the risk of bending the unbonded, flexible pipe too much and accordingly he can select a suitable material for the stiffening cover.

In one embodiment the stiffening material has a flexural modulus which is at least about 500 MPa, such as at least about 1000 MPa, such as at least about 1200 MPa such as at least about 1400 MPa, such as at least about 1500 MPa, such as at least about 1800 MPa, such as at least about 2000 MPa, such as at least about 2500 MPa.

Examples of materials which may be applied alone or in combination with other materials as stiffening material comprise the materials selected from polyolefins, e.g. polyethylene or poly propylene; polyamide, e.g. poly amide-imide, polyamide-11 (PA-11), polyamide-12 (PA-12) or polyamide-6 (PA-6)); polyimide (PI); polyurethanes; polyureas; polyesters; polyacetals; polyethers, e.g. polyether sulphone (PES); polyoxides; polysulfides, e.g. polyphenylene sulphide (PPS); polysulphones, e.g. polyarylsulphone (PAS); polyacrylates; polyethylene terephthalate (PET); polyether-etherketones (PEEK); polyvinyls; polyacrylonitrils; polyetherketoneketone (PEKK); copolymers of the preceding; fluorous polymers e.g. polyvinylidene diflouride (PVDF), homopolymers or copolymers of vinylidene fluoride ("VF2"), homopolymers or copolymers of trifluoroethylene ("VF3"), copolymers or terpolymers comprising two or more different members selected from VF2, VF3, chlorotrifluoroethylene, tetrafluoroethylene, hexafluoropropene, or hexafluoroethylene; compounds comprising one or more of the above mentioned polymers, and composite materials, such as a polymer (e.g. one of the above mentioned) compounded with reinforcement fibers, such as glass-fibers, carbon-fibers and/or aramide fibers.

In one embodiment the stiffening cover comprises or consists essentially of a combination of thermoplastic polyethylene (TPE) and thermoplastic polyvinyl (TPV).

In a preferred embodiment the stiffening cover comprises a stiffening material selected from cross-linked and non-cross-linked polyethylens, the stiffening material preferably being selected from substantially non-cross linked, high density poly ethylene (HDPE) having a density of at least about 940 kg/m$^3$, and medium density poly ethylene (MDPE) having a density of from about 925 kg/m$^3$ to about 940 kg/m$^3$, the stiffening material preferably being a HDPE, more preferably a HDPE having a density of at least about 945 kg/m$^3$.

The HDPE and/or MDPE may be any kind of HDPE/MDPE. An at present preferred HDPE and/or MDPE comprises an ethylene content of at least 80% by mole, such as at least 85% by mole, such as at least 90% by mole, such as at least 95% by mole, based upon the total polymeric mole content of the HDPE polymer.

The total polymeric mole content of the HDPE/MDPE polymer includes all polymers, but not inorganic fillers and other inorganic materials.

In one embodiment the HDPE or the MDPE comprises up to about 20% by mole, such as up to about 15% by mole, such as about 10% by mole, such as up to about 5% by mole of $C_3$-$C_{20}$ alpha olefins based upon the total polymeric mole content of the HDPE/MDPE, such as butane, methyl pentene, hexane, octane and combinations thereof.

In one embodiment the stiffening material comprises up to about 20% by weight, such as up to about 15% by weight, such as about 10% by weight, such as up to about 5% by weight of inorganic filler, based upon the total weight of the HDPE polymer, the inorganic filler may for example comprise one or more of pigments; heat stabilizers; process stabilizers; metal deactivators, flame-retardants; clay silicates e.g. kaolinite, such as dickite, halloysite, nacrite and serpentine; smectite, such as pyrophyllite, talc, vermiculite, sauconite, saponite, nontronite hectorites (magnesiosilicates) and montmorillonite (bentonite); Illite; chlorite; and synthetic clays, such as hydrotalcite; and/or reinforcement fillers e.g. glass particles, glass fibres, mineral fibres, talcum, carbon, carbonates, silicates, and metal particles. In general it is known that filler in a polymer may increase the stiffness of the polymer as well as improve its barrier properties. On the other hand too much filler may result in an increase in risk of forming undesired cracks which may lead to local defects of the pipe in bending areas. In general it is desired that the stiffening material does not comprise more than about 20% by weight of inorganic filler material.

In one embodiment the stiffening material comprises or consists of low density poly ethylene (LDPE).

The stiffening cover may in one embodiment comprise two or more materials, preferably arranged in layers and or in sections. If the stiffening cover comprises two or more layers these two or more materials may preferably be mechanically and/or chemically bonded to each other, e.g. by glue, partly melting into each other, welding or other methods.

In one embodiment the stiffening cover comprises at least two stiffening materials, the at least two stiffening materials preferably being different grades of PE.

By providing the stiffening cover with layers of stiffening material with different stiffness properties a desired stiffening profile against bending of the pipe at various bending angles can be provided. The stiffening cover may for example have an innermost layer of a stiffening material with a relatively low flexural modulus and an outermost layer with a relatively high flexural modulus.

In one embodiment the stiffening cover comprises an integrated armoring material e.g. in the form of metal strips or wires—for providing additional stiffening effect.

In order to maintain high dynamic flexibility at low bending degrees of the pipe, it is in one embodiment desired that the stiffening material is a non-foamed material. Preferably the stiffening cover is substantially of non-foamed material(s). For avoiding an undesired and/or uncontrolled buoyancy effect it is generally also desired that the stiffening material is non-foamed.

The stiffening cover may in principle have any thickness. However, if the stiffening cover is too thin it may not have any relevant stiffening effect on the stiffened length section. In order to provide an adequate stiffening effect on the stiffened length section it is desired that the stiffening cover has a thickness of at least about 3 mm, such as at least about 5 mm, such as at least about 8 mm, such as at least about 1 cm, such as at least about 1.5 cm, such as at least about 2 cm, such as at least about 2.5 cm, such as at least up to about 5 cm, such as at least up to about 4 cm.

In one embodiment the outer sealing sheath has an outer diameter, the stiffening cover has a thickness which is from about 3 mm to about half the outer diameter of the outer sealing sheath, such as up about ¼ of the outer sealing sheath.

The thickness of the stiffening cover may in one embodiment vary along the length of the stiffening section, thereby providing even further design possibilities.

In one embodiment the stiffening cover is substantially constant along the length of the stiffening section, however, if the stiffening section is not the whole length of the pipe, it is often desired that the thickness of the stiffening cover at the ends of the stiffening cover is beveled or chamfered.

The stiffened length section should preferably have a length which is sufficiently long to provide a bending area of the unbonded, flexible pipe. In one embodiment the stiffened length section of the unbonded, flexible pipe has a length of at least about 50 m, such as at least about 100 m, such as at least about 200, such as at least about 500 m, such as about half of the length of the unbonded, flexible pipe.

In one embodiment the stiffened length section of the unbonded, flexible pipe has a length of up to about 90%, such as up to about 80%, such as up to about 50% of the length of the unbonded, flexible pipe.

As it is clear from the above description the stiffening cover need not cover the whole length of the pipe. This provides an additional possibility for designing the unbonded, flexible pipe for a particular use. For example the stiffening cover need only be applied in length sections of the pipe where the risk of too much bending of the pipe is high, whereas other length(s) of the unbonded, flexible pipe need not be covered by the stiffening cover. This has several beneficial effects. First, the cost is minimized, second the flexibility in the length section(s) not comprising a stiffening cover is maintained unaltered, and third the additional weight due to the stiffening cover can be kept as low as possible.

The stiffened length section may for example be selected to be in areas where the unbonded, flexible pipe is adapted to be connected to a subsea structure, to be anchored to the seabed and or to be applied in a wave configuration.

In one embodiment the unbonded, flexible pipe comprises two or more stiffened length sections having equal or different length, and/or stiffness cover.

In certain applications it may be desired that the stiffened length section of the unbonded, flexible pipe constitutes substantially the whole length of the pipe.

Unbonded, flexible pipes are usually terminated by being connected to an end fitting e.g. for connection with a structure, such as a subsea structure, a platform a ship, another pipe or other elements. Since the pressure to which the individual layers of the unbonded, flexible pipe may be subjected can be very high and very different from each other, the individual layers are often mounted in the end fitting one by one. Generally the end fitting is a considerable cost factor of a flexible pipe system, and in general the larger diameter of the unbonded, flexible pipe, the larger end fitting is required.

In one embodiment the unbonded, flexible pipe comprises a first and a second end, at least one of the first and the second end is connected to an end fitting, such that one or more of the layers of the unbonded, flexible pipe are independently fixed to the end fitting. The outer sealing sheath is fixed to the end fitting in an end section of the outer sealing sheath and the stiffness cover diverges from the outer sealing sheath at the end section of the outer sealing sheath, in other words the stiffening cover is not fixed in the end fitting together with the outer sealing sheath.

In one embodiment the unbonded, flexible pipe comprises a first and a second end, at least one of the first and the second end is connected to an end fitting, such that one or more of the layers of the unbonded, flexible pipe are independently fixed to the end fitting. The stiffening cover is not fixed to provide a tight connection to the end fitting. The stiffening cover may be loosely attached to the end fitting e.g. to an outer side of the end fitting. In a preferred embodiment the stiffening cover is terminated at a distance from the end fitting.

By not fixing the stiffening cover in the end fitting large savings can be obtained whereby the unbonded, flexible pipe becomes even more cost effective.

In one embodiment the stiffening cover is substantially impermeable to liquid such as sea water.

In one embodiment the stiffness cover is permeable to water such that water can penetrate to the inner side of the stiffness cover. The stiffness cover may for example comprise one or more perforations, such as perforations arranged at suitable distances e.g. between about 1 and about 30 cm. The perforations may have any shape or size. The shape and size may be optimized to obtain desired stiffness properties of the stiffening cover. By providing the stiffening cover as a liquid permeable stiffening cover, the resulting pressure provided by hydrostatic pressure acting at the outer sealing sheath may be substantially independent of the stiffening cover. Further more the risk of overheating the outer sheath in case the transferred fluid has a high temperature, can be reduced when the stiffening cover is water permeable.

The stiffening cover may be provided with friction properties which differ from the friction properties of the outer sealing sheath. The outer sealing sheath has an outermost surface and the stiffness cover has an outer surface and accordingly the stiffening cover may be provided such that the outer surface of the stiffening cover has a different friction coefficient than the outermost surface of the outer sealing sheath.

This possibility can be used for designing the unbonded, flexible pipe for a particular use. For example it may in one embodiment be desired to provide the stiffened length section with an increased friction coefficient for mounting clamps or other elements e.g. elements which are easier to fix in areas with high friction.

In another embodiment it may be desired to provide the stiffened length section with a decreased friction coefficient for allowing the unbonded, flexible pipe to slide freely over and around edges and irregular surfaces and also to resist water and soiling damage.

Accordingly, in one embodiment the outer surface of the stiffness cover has a substantially higher or substantially lower static coefficient of friction (µs) measured according to ASTM D1894 at 23° C., in dry condition against itself, compared with the static coefficient of friction of the outermost surface of the outer sealing sheath measured against itself under similar conditions.

In one embodiment the outer sealing sheath has an outermost surface and the stiffness cover has an outer surface, the outer surface of the stiffness cover has a substantially higher or substantially lower static coefficient of friction (µs) measured according to ASTM D1894 at 23° C., in wet (wetted with water) condition against itself, compared with the static coefficient of friction of the outermost surface of the outer sealing sheath measured against itself under similar conditions.

In one embodiment the outer sealing sheath has an outermost surface and the stiffness cover has an outer surface with a first ands a second sub-section, the first section of the outer surface of the stiffness cover has a substantially higher static coefficient of friction (µs) measured according to ASTM D1894 at 23° C., in wet (wetted with water) condition against itself, and the second section of the outer surface of the stiffness cover has a substantially lower static coefficient of friction (µs) measured according to ASTM D1894 at 23° C., in wet (wetted with water) condition against itself, compared with the static coefficient of friction of the outermost surface of the outer sealing sheath measured against itself under similar conditions.

In one embodiment it is desired that the stiffening cover totally surrounds the outer sealing sheath in the stiffened length section. Thereby the stiffening cover is simple to produce and may in a very stable manner be applied to the outer sealing sheath of the unbonded, flexible pipe.

In one embodiment the stiffness cover partially surrounds the outer sealing sheath in the stiffened length section. The outer sealing sheath may preferably have an annular extension, the stiffness cover preferably extends at least about 60% of the annular extension, such as at least about 70% of the annular extension, such at least about 75% of the annular extension, such at least about 80% of the annular extension, such at least about 75% of the annular extension, such at least about 90% of the annular extension of the outer sealing sheath in the stiffened length section. By applying the stiffening cover to merely partially surround the outer sealing sheath in the stiffened length section, saving may be obtained both due to saving of cost and reduced weight of the unbonded, flexible pipe compared with unbonded, flexible pipe in which the stiffening cover totally surrounds the outer sealing sheath.

The stiffness cover may preferably be applied in direct contact with the outer sealing sheath, and optionally the stiffness cover may be mechanically or chemically bonded to the outer sealing sheath. It should be observed that intermediate layer or layers could be applied between the outer sealing sheath and the stiffening cover.

The stiffening cover may be applied by any methods. In one embodiment the stiffness cover is applied by extrusion, winding, folding or a combination thereof.

The stiffening cover may for example be applied on site, i.e. after the remaining parts of the unbonded, flexible pipe have been provided and the unbonded, flexible pipe has been transported to the site of use. In one embodiment the stiffness cover is applied by folding or winding onto the outer sealing sheath after the fabrication of the remaining parts of the pipe has been terminated.

The invention also relates to a method of increasing the stiffness of one or more stiffened length sections of an unbonded, flexible pipe of the type comprising from inside out, a tubular inner sealing sheath, at least one metal armor layer and an outer sealing sheath of a sealing material, the method comprises the step of providing the unbonded, flexible pipe with a stiffening cover partially or totally surrounding the outer sealing sheath in the stiffened length section, the stiffening cover comprises a layer of a stiffening material which is sufficiently thick to increase the bending stiffness of the stiffened length section(s) of the unbonded, flexible pipe with at least about 10%, such as at least about 15%, such as at least about 20%, such as at least about 25%, such as at least about 30%, such as at least about 40%, such as at least about 50%.

The bending stiffness is determined as the force required to bend the stiffened length section(s) of the unbonded flexible pipe from a straight position to a bending radius of about 10 m at 20° C. The stiffness is measured with the stiffening cover and without the stiffening cover and the increase in stiffness of the stiffened length section with the stiffening cover relative to the stiffness of the stiffened length section without the stiffening cover is determined.

In one embodiment the stiffening cover comprises a layer of a stiffening material selected from polyolefins, e.g. polyethylene or poly propylene; polyamide, e.g. poly amide-imide, polyamide-11 (PA-11), polyamide-12 (PA-12) or polyamide-6 (PA-6)); polyimide (PI); polyurethanes; polyureas; polyesters; polyacetals; polyethers, e.g. polyether sulphone (PES); polyoxides; polysulfides, e.g. polyphenylene sulphide (PPS); polysulphones, e.g. polyarylsulphone (PAS); polyacrylates; polyethylene terephthalate (PET); polyetherether-ketones (PEEK); polyvinyls; polyacrylonitrils; polyetherketoneketone (PEKK); copolymers of the preceding; fluorous polymers e.g. polyvinylidene diflouride (PVDF), homopolymers or copolymers of vinylidene fluoride ("VF2"), homopolymers or copolymers of trifluoroethylene ("VF3"), copolymers or terpolymers comprising two or more different members selected from VF2, VF3, chlorotrifluoroethylene, tetrafluoroethylene, hexafluoropropene, or hexafluoroethylene; compounds comprising one or more of the above mentioned polymers, and composite materials, such as a polymer (e.g. one of the above mentioned) compounded with reinforcement fibers, such as glass-fibers, carbon-fibers and/or aramide fibers.

In one embodiment of the method of the invention the stiffening cover comprises or consists essentially of a combination of thermoplastic polyethylene (TPE) and thermoplastic polyvinyl (TPV).

The stiffening material may further be as described above. In one embodiment of the method of the invention the stiffening material has a flexural modulus as described above. In one embodiment the stiffening material comprises one or more fillers e.g. as described above.

In one embodiment of the method the stiffening material is selected from polyethylene (PE), high density PE (HDPE), cross-linked PA (PEX), polyamide-11 (PA-11), polyamide-12 (PA-12), polyamide-6 (PA-6)), mixtures and combinations thereof, and composite materials thereof comprising at least one of the before mentioned polymers compounded with reinforcement fibers.

In one embodiment the stiffening cover comprises a continuous layer of a stiffening material; the stiffening material is preferably a substantially homogeneous polymer material. By applying the stiffening material as a continuous layer— i.e. a layer with substantially equal thickness in the whole length of the one or more stiffened length sections—an equally distributed stiffness can be obtained, which may further reduce the risk of over bending and crack of the pipe when subjected to high forces. By providing the stiffening material in the form of a substantially homogeneous polymer material over the one or more stiffening sections the stiffness obtained can be even more evenly distributed which accordingly result in a highly reliable stiffness In one embodiment the stiffening material is selected from polyethylene (PE), high density PE (HDPE), cross-linked PA (PEX), polyamide-11 (PA-11), polyamide-12 (PA-12), polyamide-6 (PA-6)), mixtures and combinations thereof, and composite materials thereof comprising at least one of the before mentioned polymers compounded with reinforcement fibers.

In one embodiment of the method is the stiffening material substantially identical to the material of the outer sealing sheath.

In one embodiment of the method wherein the outer sealing sheath is of polyamide, the stiffening material is also of polyamide.

The stiffening material may have a flexural modulus as described above.

In one embodiment of the method is the stiffening material different from the material of the outer sealing sheath, preferably such that the stiffening material has flexural modulus which is higher than the flexural modulus of the sealing material, wherein the flexural modulus is determined according to ISO 178.

In one embodiment of the method, the pipe comprises one stiffened length section, which extent in substantially the whole length of the flexible pipe.

The length(s) of the stiffening section(s) may be as described above.

In one embodiment of the method is the pipe comprises one stiffened length section, which extent only in a section of the whole length of the flexible pipe, such as in a section of about 20 to about 500 m of the pipe.

In one embodiment of the method is the pipe comprises several stiffened length sections.

In one embodiment the thickness of the stiffening cover is substantially constant along the length of at least a part of the stiffening section of the pipe.

In one embodiment the thickness of the stiffening cover is varying along the length of at least a part of the stiffening section of the pipe.

In one embodiment the stiffening cover is comprises a first and a second end, the stiffening cover is beveled or chamfered adjacent to at least one of its ends.

In one embodiment the unbonded, flexible pipe comprises a first and a second end, at least one of the first and the second end is connected to an end fitting, such that one or more of the layers of the unbonded, flexible pipe are independently fixed to the end fitting, the outer sealing sheath being fixed to the end fitting in an end section of the outer sealing sheath and the stiffness cover diverges from the outer sealing sheath at the end section of the outer sealing sheath. Accordingly the stiffening cover is not fixed to provide a tight connection to the end fitting.

The stiffness cover may be permeable to water as described above such that water can penetrate to the inner side of the stiffness cover. The stiffness cover optionally comprises one or more perforations.

The static coefficient of friction of the outermost surface of the outer sealing sheath measured and/or the static coefficient of friction of the outer surface of the stiffness cover may be as described above.

In one embodiment wherein the stiffness cover is applied in direct contact with the outer sealing sheath, the stiffness cover preferably being mechanically or chemically bonded to the outer sealing sheath.

The stiffness cover may e.g. be applied by the methods described above.

What is claimed is:

1. An unbonded, flexible pipe having a length and comprising from inside out;
    a tubular inner sealing sheath,
    at least one metal armor layer,
    an outer sealing sheath of a sealing material, and
    at least one stiffened length section comprising a stiffening cover partially or totally surrounding the outer sealing sheath in the stiffened length section, said stiffening cover comprising a layer of stiffening material having a flexural modulus which is higher than the flexural modulus of the sealing material, wherein the flexural modulus is determined according to ISO 178 and wherein the at least one metal armor layer is helically wound and not bonded to the inner sealing sheath, to the outer sealing sheath, or to another metal armor layer.

2. An unbonded, flexible pipe as claimed in claim 1, wherein the flexural modulus is determined according to ISO 178 at a raised temperature, about 50° C.

3. An unbonded, flexible pipe as claimed in claim 1, wherein the stiffening material has a flexural modulus which is at least about 10 MPa higher than the flexural modulus of the outer sealing sheath.

4. An unbonded, flexible pipe as claimed in claim 1, wherein the stiffening material has a flexural modulus which is at least about 500 MPa.

5. An unbonded, flexible pipe as claimed in claim 1, wherein the stiffening material is selected from polyolefins; polyamide; polyimide (PI); polyurethanes; polyureas; polyesters; polyacetals; polyethers; polyoxides; polysulfides; polysulphones; polyacrylates; polyethylene terephthalate (PET); polyether-ether-ketones (PEEK); polyvinyls; polyacrylonitrils; polyetherketoneketone (PEKK); copolymers of the preceding; fluorous polymers; compounds comprising one or more of the above mentioned polymers, and composite materials compounded with reinforcement fibers.

6. An unbonded, flexible pipe as claimed in claim 5 wherein the stiffening material is a substantially non-cross linked, high density poly ethylene (HDPE) having a density of at least about 940 kg/m$^3$.

7. An unbonded, flexible pipe as claimed in claim 6, wherein the HDPE comprises an ethylene content of at least 80% by mole based upon the total polymeric mole content of the HDPE polymer.

8. An unbonded, flexible pipe as claimed in claim 6, wherein the HDPE comprises up to about 20% by mole of $C_3$-$C_{20}$ alpha olefins based upon the total polymeric mole content of the HDPE.

9. An unbonded, flexible pipe as claimed in claim 1, wherein the stiffening cover comprises two or more materials arranged in layers and being at least mechanically or chemically bonded to each other.

10. An unbonded, flexible pipe as claimed in claim 9, wherein the two or more materials of the stiffening cover comprises at least two stiffening materials.

11. An unbonded, flexible pipe as claimed in claim 1, wherein the stiffening cover has a thickness of at least about 3 mm.

12. An unbonded, flexible pipe as claimed in claim 1, wherein the stiffened length section of the unbonded, flexible pipe has a length of at least about 50 m.

13. An unbonded, flexible pipe as claimed in claim 1, wherein the stiffened length section of the unbonded, flexible pipe has a length of up to about 90% of the length of the unbonded, flexible pipe.

14. An unbonded, flexible pipe as claimed in claim 1, wherein the unbonded, flexible pipe comprises two or more stiffened length sections.

15. An unbonded, flexible pipe as claimed in claim 1, wherein the stiffened length section of the unbonded, flexible pipe constitutes substantially the whole length of the pipe.

16. An unbonded, flexible pipe as claimed in claim 1, wherein the unbonded, flexible pipe comprises a first and a second end, at least one of the first and the second end is connected to an end fitting, such that one or more of the layers of the unbonded, flexible pipe are independently connected to the end fitting, and the stiffening cover is not connected to the end fitting.

17. An unbonded, flexible pipe as claimed in claim 1, wherein the stiffening cover is permeable to water such that water can penetrate to the inner side of the stiffening cover.

18. An unbonded, flexible pipe as claimed in claim 1, wherein the outer sealing sheath has an outermost surface and the stiffening cover has an outer surface with a first and a second sub-sections, the first sub-section of the outer surface of the stiffening cover has a substantial higher static coefficient of friction (μs) measured according to ASTM D1894 at 23° C., in wet condition against it self, and the second sub-section of the outer surface of the stiffening cover has a substantial lower static coefficient of friction (μs) measured according to ASTM D1894 at 23° C., in wet condition against it self, compared to the static coefficient of friction of the outermost surface of the outer sealing sheath measured against it self under similar conditions.

19. An unbonded, flexible pipe as claimed in claim 1, wherein the stiffening cover is applied in direct contact with the outer sealing sheath.

20. An unbounded, flexible pipe of claim 1 wherein the pipe is an umbilical.

* * * * *

UNITED STATES PATENT AND TRADEMARK OFFICE
CERTIFICATE OF CORRECTION

| | | |
|---|---|---|
| PATENT NO. | : 9,012,001 B2 | Page 1 of 1 |
| APPLICATION NO. | : 13/515337 | |
| DATED | : April 21, 2015 | |
| INVENTOR(S) | : Claus Dencker Christensen | |

It is certified that error appears in the above-identified patent and that said Letters Patent is hereby corrected as shown below:

On the title page, under (30) Foreign Application Priority Data, please replace
"Nov. 20, 2010 (DK) ......... 2010 01020" with -- Nov. 9, 2010 (DK)......... 2010 01020 --

Signed and Sealed this
Sixth Day of October, 2015

Michelle K. Lee
*Director of the United States Patent and Trademark Office*